Patented Feb. 27, 1951

2,542,970

UNITED STATES PATENT OFFICE 2,542,970

REFINING OF CRACKED NAPHTHAS BY SELECTIVE HYDROGENATION

Minor C. K. Jones, Mountainside, N. J., assignor to Standard Oil Development Company, a corporation of Delaware No Drawing. Application June 15, 1946, Serial No. 677,080

1 Claim. (Cl. 196—24)

This invention relates to a process for refining cracked naphthas by a selective hydrogenation using a noble metal in a catalytic material resistant to ordinary poisons and capable of regeneration.

An object of this invention is to provide a method of treating unstable cracked distillates difficult to refine by ordinary chemical and clay treating processes without incurring large losses of valuable antiknock fuel ingredients. Unsaturated and aromatic products formed by severe cracking in the manufacture of aviation and high antiknock motor fuels ordinarily contain sulfur compounds and considerable quantities of gum-forming conjugated diolefins. Removal of the gum-forming diolefins by polymerization even under optimum conditions tends to result in losses up to 20% by volume, and the diolefin gums recovered have limited utility. Therefore, a preferred method of securing stabilization of the cracked products is one wherein the diolefins are selectively hydrogenated with no substantial loss of fuel ingredients and the stabilized fuel product has improved antiknock value, as shown in the present invention.

A further object of this invention is to provide a method of effecting substantial reduction of sulfur content in a selective hydrogenation treatment of hydrocarbon products using a catalytic material which is resistant to sulfur poisoning.

There has been considerable research work on the use of noble metal catalysts in the hydrogenation of pure hydrocarbon compounds. The noble metals have been recognized in the art as belonging to the class of the most active hydrogenation catalysts, which catalyze hydrogenation at low temperatures, but which, in general, are very sensitive to various poisons, particularly sulfur compounds, that are usually present in petroleum products.

The catalytic materials used in carrying out the method of the present invention are very resistant to poisonous action of the sulfur compounds, organic peroxides, and highly unsaturated polymers present in cracked petroleum products. They have been used in continuous operations lasting over 100 hours in treating petroleum products without loss of activity. They can be satisfactorily regenerated by controlled burning of carbonaceous deposits which tend to form at elevated temperatures.

To prepare the catalytic materials for the present method, a small amount of a platinum group noble metal selected from the class consisting of platinum and palladium, e. g., 0.1 to 10% by weight, is incorporated with a carrier of the nature of alumina, which is a hydrous oxide having ultramicroscopic pores. Silica gel is another example of this type of carrier.

Two types of procedures may be used for depositing the noble metal of colloidal particle size on the carriers: (1) impregnation of the carrier with a salt solution (e. g., ammonium chloroplatinate or chloroplatinous acid), followed by slow drying, and heat decomposition of the deposited salt; and (2) mulling of the carrier in powdered form with colloidal particles of the noble metal (e. g., platinum black), followed by extruding or pilling. The mulled mixture is extruded wet, then dried. The pilled mixture is dry when compressed into the compact form of a pill or pellet. The compact form is preferred for the present method.

The pelleted catalytic material may be used in a fixed bed type of operation or the compact material may be granulated to smaller size for use with a fluid or moving catalyst technique.

The temperatures used in the treatment range from about 200° F. to 700° F. and are specifically controlled to obtain selective reduction of diolefins and desulfurization accompanied by improvement of antiknock values. Practical reaction zone pressures range from 1 to several atmospheres, excess hydrogen being used.

The effectiveness of the specific catalytic materials and critical requirements of temperature control are indicated by the following examples and test data:

*Example 1*

High temperature (1200° F.) steam-cracked naphtha distillate was passed with hydrogen (1500 cubic feet per 42 gal. bbl.) over cylindrical ⅛ x ⅛-inch pellets of alumina-supported 2% palladium catalyst at 200° F. at 1 atmosphere. Recovery was practically 100%. The bromine number was reduced only from 119 to 116, but diolefin content was made substantially negligible, giving improved stability and inhibitor response. Copper dish gum was reduced from 135 to 8, and ASTM breakdown increased from 15 to 220 without adding inhibitor. In the treatment at 400° F., the bromine number was reduced to 91, but the product stability showed no further improvement. Motor octane ratings were improved 2 to 5 points.

*Example 2*

The light fraction (126°–323° F.) from catalytic cracking of gas oil was treated with hydrogen at 200° and 400° F. In the presence of pellets containing 2% platinum on alumina, the bromine number was reduced from 86 to 77 and to 17, respectively, at the two temperatures. With greater saturation of olefins, there was less improvement of clear and leaded research octane numbers, although leaded aviation and motor ratings were improved.

A run to check catalyst activity after treating high sulfur stocks from West Texas crude naphtha indicated that the platinized alumina was resistant to sulfur poisoning because similar results were obtained.

Pellets of 2% palladium on alumina gave results at both 200° F. and 400° F. similar to the results with platinized alumina at 200° F.

*Example 3*

Heavy naphtha (200°–430° F.) from catalytic cracking of gas oil was treated with hydrogen at 200° F., 300° F., 400° F., and 600° F. with the catalytic materials. In each instance, the diolefin content was reduced to a negligible amount, and the products showed satisfactorily improved stability and inhibitor response. Without inhibitor, A. S. T. M. breakdown was increased from 80 to 890 minutes, and copper dish gum was reduced from 621 to 32 mg. before rerunning. The rerun product contained only 4 mg. gum. Natural phenolic constituents helpful to storage stability are retained, as they are not hydrogenated under these conditions. Product recoveries were above 97%. The clear and leaded octane ratings were increased 1 to 4 points.

With increased temperatures in the treatment of the cracked heavy naphthas, the saturation was greater, but the leaded octane ratings reached a maximum improvement at temperatures between 200° and 400° F.

*Example 4*

Pressure cracking light and heavy naphthas of high sulfur content were treated for desulfurization by passing the naphthas with hydrogen over the catalytic materials.

Desulfurization of the light naphthas was accompanied by improvements of 1 to 4.4 points in leaded octane ratings by the treatments at 400° F. to 600° F., sulfur reduction being more pronounced at the higher temperatures.

Desulfurization of the heavy naphthas was accompanied by improvements of 14 to 24 points in leaded octane ratings by treatments at 400° F. to 600° F., sulfur reduction being more pronounced at the higher temperatures.

When the supported noble metal catalysts are used at temperatures above 700° F., they tend to become more rapidly coked. However, the coked catalyst is satisfactorily regenerated by controlled burning of the carbonaceous deposit with an air-inert gas (nitrogen) mixture at temperatures ranging from 700° F. to 1100° F. The thus-regenerated catalysts resume their original activity. Satisfactory regeneration is very important in the commercial use of the precious metal catalysts.

It will be noted that very efficient use can be made of the catalytic material in separately treating a light cracked naphtha distillate fraction (e. g., boiling principally below 232° F.) and a heavy cracked naphtha distillate fraction (e. g., boiling principally in the range 200° F. to 430° F.) so that diolefins are reduced in the light fraction with limited saturation of mono-olefins therein and substantial desulfurization of the heavy fraction is obtained. The optimum improvement in stability and antiknock value of the light fraction is obtained when it is passed in vapor phase with excess hydrogen over the catalytic material at temperatures in the range from 200° F. to 400° F. Optimum improvement of the heavy fraction is obtained when it is passed in vapor phase with excess hydrogen over the catalytic material at temperatures in the range from 400° F. to 700° F. A resulting blend of products from the thus separately treated light and heavy fractions is more effectively and economically improved, particularly if the light naphtha fractions have a normal or low sulfur content.

I claim:

The method of refining cracked petroleum naphtha distillates to obtain a fuel blend of improved stability and antiknock performance, which comprises selectively reacting diolefins in a low boiling fraction of said naphtha distillates passed in vapor phase with excess hydrogen at temperatures in the range from 200° F. to 400° F. over a catalytic material consisting essentially of 0.1 to 10% by weight of a finely-divided metal selected from the group consisting of platinum and palladium carried on alumina, reducing sulfur components and saturating unsaturated components of a heavy fraction of said naphtha distillates passed in vapor phase with excess hydrogen at temperatures in the range from 400° F. to 700° F. over a catalytic material consisting essentially of 0.1 to 10% by weight of a finely-divided metal of the group consisting of platinum and palladium on alumina; and blending products of the thus-treated light and heavy fractions.

MINOR C. K. JONES.

REFERENCES CITED

The following references are of record in the file of this patent:

UNITED STATES PATENTS

| Number | Name | Date |
| --- | --- | --- |
| 2,025,255 | Taylor et al. | Dec. 24, 1935 |
| 2,029,100 | Grosse | Jan. 28, 1936 |
| 2,143,364 | Taylor | Jan. 10, 1939 |
| 2,147,268 | Pyzel | Feb. 14, 1939 |
| 2,289,716 | Marschner | July 14, 1942 |
| 2,332,572 | Hepp | Oct. 26, 1943 |
| 2,371,298 | Hudson et al. | Mar. 13, 1945 |
| 2,376,086 | Reid | May 15, 1945 |
| 2,413,312 | Cole | Dec. 31, 1946 |
| 2,422,671 | Haensel et al. | June 24, 1947 |
| 2,440,673 | Jones | May 4, 1948 |

FOREIGN PATENTS

| Number | Country | Date |
| --- | --- | --- |
| 333,511 | Great Britain | Aug. 5, 1930 |
| 345,738 | Great Britain | Apr. 2, 1931 |